(12) United States Patent
Laszkiewicz et al.

(10) Patent No.: US 12,550,079 B2
(45) Date of Patent: Feb. 10, 2026

(54) DYNAMIC ADJUSTABLE POWER OFFSETS IN POWER CONTROL OF UPLINK CARRIER AGGREGATION

(71) Applicant: ERICSSON AB, Stockholm (SE)

(72) Inventors: Maciej Laszkiewicz, Wroctaw (PL); Ariel Chlasciak, Bagno (PL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 429 days.

(21) Appl. No.: 18/040,268

(22) PCT Filed: Oct. 24, 2020

(86) PCT No.: PCT/IB2020/060008
§ 371 (c)(1),
(2) Date: Feb. 2, 2023

(87) PCT Pub. No.: WO2022/038404
PCT Pub. Date: Feb. 24, 2022

(65) Prior Publication Data
US 2023/0269675 A1  Aug. 24, 2023

Related U.S. Application Data

(60) Provisional application No. 63/068,982, filed on Aug. 21, 2020.

(51) Int. Cl.
*H04W 52/36* (2009.01)
*H04W 52/08* (2009.01)
*H04W 52/28* (2009.01)

(52) U.S. Cl.
CPC ......... *H04W 52/367* (2013.01); *H04W 52/08* (2013.01); *H04W 52/28* (2013.01)

(58) Field of Classification Search
CPC .... H04W 52/08; H04W 52/28; H04W 52/367
See application file for complete search history.

(56) References Cited

U.S. PATENT DOCUMENTS

| 2011/0319120 A1 | 12/2011 | Chen et al. |
| 2015/0043485 A1 | 2/2015 | Masuda et al. |
| 2020/0351798 A1* | 11/2020 | Ji .......................... H04W 52/10 |

FOREIGN PATENT DOCUMENTS

WO  2015020606 A1  2/2015

OTHER PUBLICATIONS

3GPP TS 36.213 V15.10.0 (Jun. 2020), 3rd Generation Partnership Project; Technical Specification Group Radio Access Network; Evolved Universal Terrestrial Radio Access (E-UTRA); Physical layer procedures (Release 15).

* cited by examiner

*Primary Examiner* — Elton Williams

(57) ABSTRACT

A network node allocates (810), to each of two or more component carriers, a respective power share of a total UE transmit power and calculates (820) a required UE transmit power to achieve a target power density at the network node, where the target power density is the sum of a nominal target power density and a predetermined power density offset. The network node reallocates (830) 5 any excess available UE transmit power over the required UE transmit power for a carrier to another carrier or carriers and calculates (840) an achievable received power density at the network node based on the allocated UE transmit powers. The network node calculates (850) an adjusted power density offset by subtracting the nominal target power density from the achievable received power density, and uses the adjusted power density offset when performing (860) closed-loop power 0 control for the carriers.

19 Claims, 9 Drawing Sheets

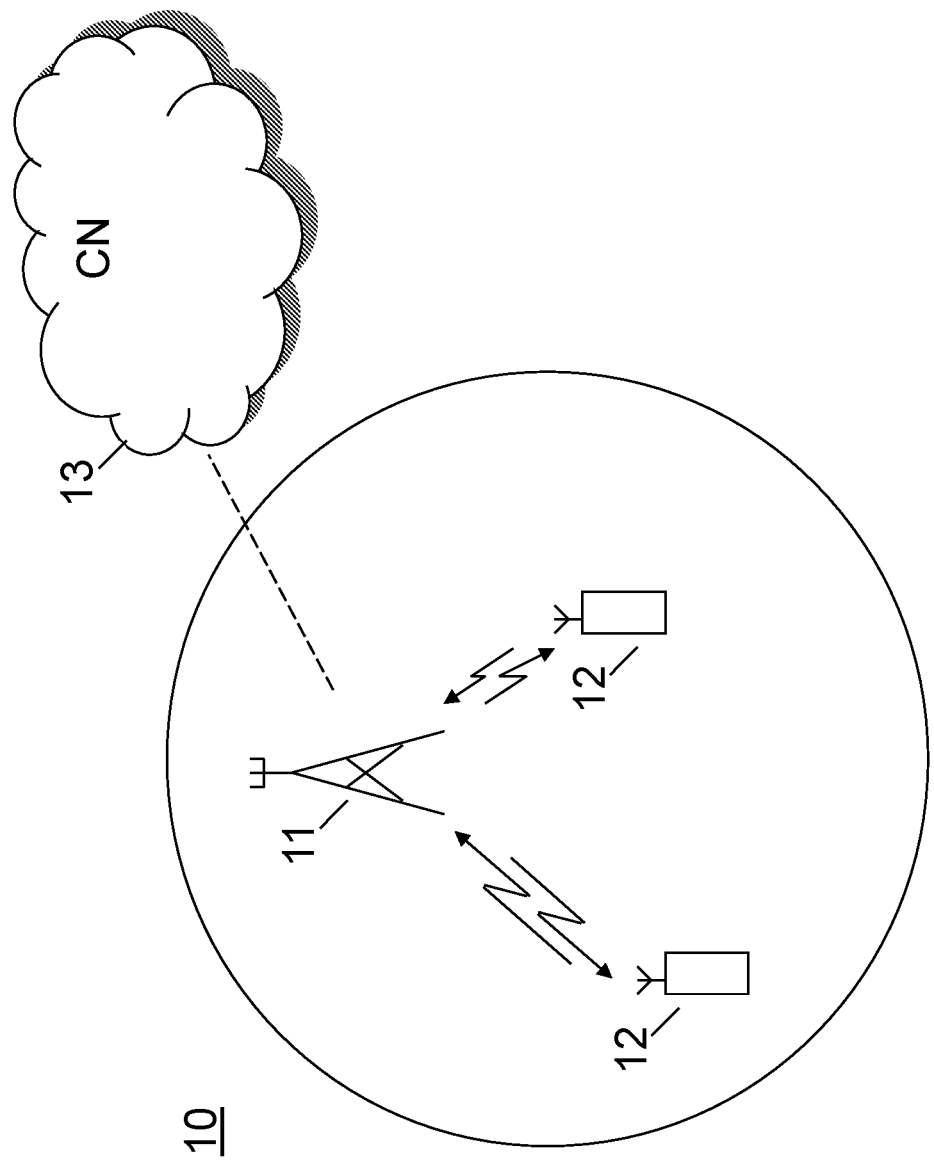

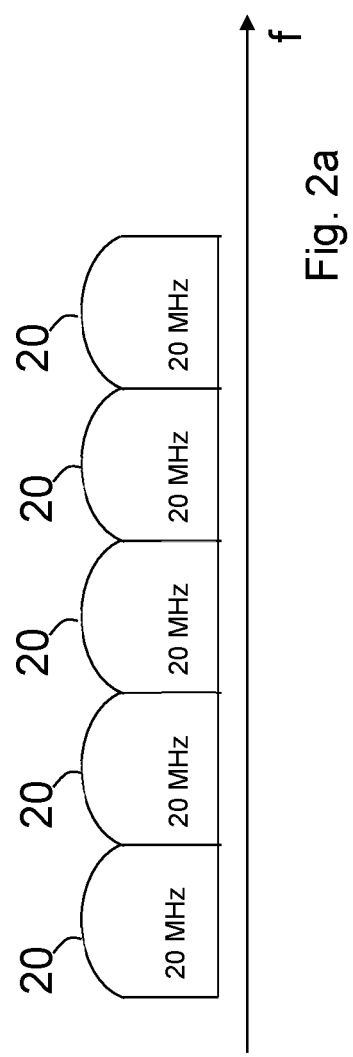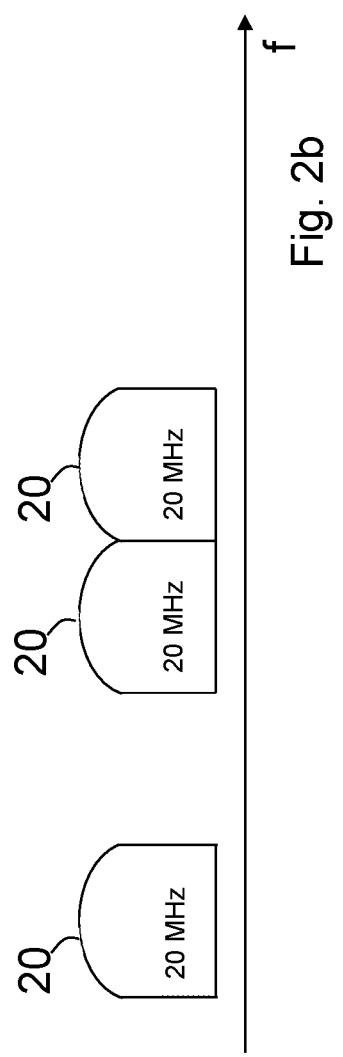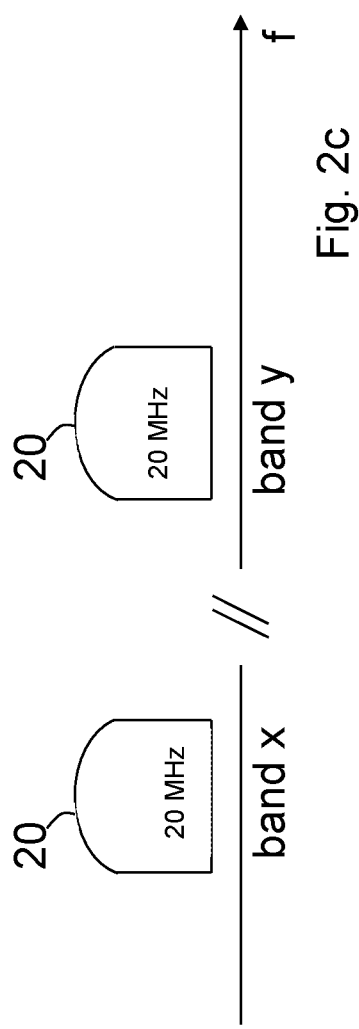

DYNAMIC ADJUSTABLE POWER OFFSETS IN POWER CONTROL OF UPLINK CARRIER AGGREGATION

PRIORITY CLAIM

This application is a national stage of International Application No. PCT/IB2020/060008, filed Oct. 24, 2020, the entire disclosure of which is fully incorporated by reference herein for all purposes.

TECHNICAL FIELD

This disclosure is generally related to wireless communications networks and is more particularly related to power control of user equipment (UE) transmit power when using carrier aggregation.

BACKGROUND

To provide context for the discussion that follows, FIG. 1 shows a part of a telecommunication network 10. The radio access network 10 comprises a plurality of radio base stations 11 (only one of which is shown in the figure), each of which communicates with a plurality of UEs (user equipments) 12 located in the coverage area of the radio base station. The base station 11 further communicates with a core network (CN) 13. For example, where the network 10 is a standardized E-UTRAN (Evolved Universal Mobile Telecommunications System (UMTS) Terrestrial Radio Access Network), the core network 13 comprises an evolved packet core, itself comprising a mobility management entity (MME), a serving gateway, and a PDN (packet data network) gateway.

To provide for higher data throughputs than could be provided with the 20-MHz bandwidth usable by E-UTRAN UEs, the $3^{rd}$-Generation Partnership Project (3GPP) developed the concept of carrier aggregation, which it specified in the 3GPP standards for what is referred to as Long-Term Evolution (LTE) Advanced. This provides compatible UEs with access to bandwidths larger than 20 MHz, but using multiple carriers, referred to as component carriers. Any one of these component carriers may appear as a conventional E-UTRAN carrier to a "legacy" UE, i.e., a UE that is not compatible with the LTE Advanced standards.

A compatible UE can realize an effective bandwidth considerably greater than 20 MHz by using carrier aggregation, whereby it utilizes two or more component carriers simultaneously. Different examples of carrier aggregation are illustrated in FIGS. 2a to 2c. A contiguous intra-band carrier aggregation is illustrated in FIG. 2a where five component carriers 20, each of 20 MHz bandwidth, have been aggregated to form a bandwidth of 100 MHz. FIG. 2b illustrates a non-contiguous intra-band carrier aggregation where three component carriers 20, each of 20 MHz bandwidth, have been aggregated together to form an aggregated bandwidth of 60 MHz. Finally, FIG. 2c illustrates an inter-band carrier aggregation where two component carriers 20 in band x and band y respectively, each of 20 MHz bandwidth, have been aggregated together to form an aggregated bandwidth of 40 MHz.

The number of aggregated component carriers as well as the bandwidth of the individual component carrier may be different for uplink and downlink. A symmetric configuration refers to the case where the number of component carriers in downlink and uplink is the same whereas an asymmetric configuration refers to the case that the number of component carriers is different. It should be noted that the number of component carriers configured in a network might be different from the number of component carriers seen by a UE. A UE may for example support more downlink component carriers than uplink component carriers, even though the network is configured with the same number of uplink and downlink component carriers.

Uplink transmit power control is an important feature in many wireless communications networks, including LTE, LTE Advanced, and other 3GPP-specified networks. Uplink transmit power control is used to ensure that signals transmitted by a UE are received at the receiving base station with enough signal strength to be reliably demodulated and decoded by the base station, while also ensuring that the signal strength is not substantially higher than is needed, to avoid overloading the base station and to avoid unnecessary interference to other communications ongoing in the same area.

Many networks, including LTE and LTE Advanced networks, use closed-loop power control to control the uplink transmit power for various signals transmitted by the UE. These closed-loop power control mechanisms may be implemented on a per-physical channel basis or per-signal basis. Thus, for example, the transmit powers for the Physical Uplink Shared Channel (PUSCH) and the Physical Uplink Control Channel (PUCCH) are controlled with separate closed-loop power control mechanisms.

With closed-loop power control, the receiving base station evaluates the signal strength and/or signal quality of the signal as received at the base station, and instructs the UE, via transmit power control (TPC) commands, to increase or reduce the transmit power allocated to the signal, in subsequent transmissions. This may be done very frequently, e.g., as frequently as every millisecond in LTE systems, thus allowing the power control mechanism to track changing radio propagation conditions.

To allow a power control to quickly converge to a near-optimal UE transmit power after the UE begins transmitting a new signal, techniques borrowed from so-called open-loop power control are used by the UE to calculate a starting point for the UE transmit power. This is done by first estimating a path loss for signals sent from the UE to the base station, e.g., by measuring a reference signal transmitted by the base station and using known information about the strength of that reference signal as transmitted to determine how much loss the reference signal experienced as it traveled from the base station to the UE. Given the path loss and a target for the received signal strength of the UE signal as received at the base station, the UE can calculate a transmit signal strength that approximates what is needed to achieve the desired signal strength. After the initial transmission, the UE can then adjust its transmit power for the signal based on the TPC commands it receives from the base station. Note that by periodically updating its estimate of the path loss, the UE can also respond to changes in signal conditions.

In LTE and LTE Advanced systems, the base station, referred to in 3GPP specifications as an Evolved Node B, eNodeB or eNB, provides the UE with a parameter that indicates this target received signal strength for a given uplink signal. For the PUSCH, for example, the eNB configures the UE with a parameter referred to as $P_{O\_NOMINAL\_PUSCH}$, which represents a targeted signal power density for the PUSCH signal as received by the eNB. Note that this parameter indicates a signal power density, representing the desired received signal power density per physical resource block (PRB). A UE may transmit multiple PRBs at one time, however, with each PRB occupying 180 kHz of bandwidth. Consequently, any calculation of the uplink transmit power for PUSCH must account for this by multiplying the targeted received signal power density by the number of PRBs that are transmitted.

In practice, the UE in an LTE or LTE Advanced network is provided with two parameters that are combined by the UE when calculating its transmit power for PUSCH, the $P_{O\_NOMINAL\_PUSCH}$ parameter mentioned above and a UE-specific parameter $P_{O\_UE\_PUSCH}$. Other adjustments and constraints on the transmit power may be configured by the network. The resulting calculation used by the UE to determine its transmit power for PUSCH, for a given cell c, when it is not simultaneously transmitting a PUCCH, takes the form of:

$$P_{PUSCH,c}(i) = \min\left\{\begin{array}{l}P_{CMAX,c}(i)\\10\log_{10}(M_{PUSCH,c}(i)) + P_{O\_PUSCH,c} + \alpha_c \cdot PL_c +\\ \Delta_{TF,c}(i) + f_c(i)\end{array}\right\}[\text{dBm}].$$

Here, $P_{CMAX,c}(i)$ is a maximum transmit power constraint. $M_{PUSCH,c}(i)$ is the number of PRBs allocated for the UE for the transmit interval, and $P_{O\_PUSCH,c}$ is the sum of the two parameters discussed above, $P_{O\_NOMINAL\_PUSCH}$ and $P_{O\_UE\_PUSCH}$, and is thus indicative of a targeted received power density, per PRB, at the eNB. $PL_c$ is the estimated path loss, while $\alpha_c$ is a scaling parameter configured by the network, ranging from 0 to 1. $\Delta_{TF,c}(i)$ is a configured offset factor related to something referred to as "maximum power reduction" or "MPR," the details of which are not relevant to the present disclosure. Finally, $f_c(i)$ is a value representing an accumulation of previously received TPC commands, where each TPC command indicates that the UE should increment or decrement $f_c(i)$, or leave it the same. Note that each of these parameters in the above equation is referenced to a given cell c, and may be specific to a transmit-time interval (TTI) i.

A variant of the above formula is used for transmit power control of PUSCH when the UE is simultaneously transmitting PUCCH, but similar concepts apply. Likewise, a similar formula is used for transmit power control of the PUCCH, in LTE and LTE Advanced. Similar mechanisms are employed in networks operating according to other standards, such as the 5G network currently under development by members of the 3GPP and widely known as New Radio, or "NR."

SUMMARY

Because of various constraints on the UE's transmit power, which may vary depending on operating band, signal bandwidth, and various operational scenarios, transmit power control becomes more complicated when carrier aggregation is in use, i.e., when the UE may transmit on two or more carriers at the same time. Furthermore, additional complications arise when higher order modulation schemes are introduced, such as 64-quadrature amplitude modulation (64QAM) and 256QAM, as each of these requires different signal-to-interference-plus-noise ratios (SINRs) as received by the eNB, for proper demodulation and decoding, as compared to each other and to lower-order modulation schemes such as 16QAM. Techniques described herein address these complications on the base station side, by providing for a dynamically adjustable power density offset, which is used by the base station when performing closed-loop power control of uplink signals transmitted by a UE.

Embodiments described herein include a method, in a network node, for controlling UE transmit power when scheduling the UE for transmission on each of two or more component carriers. This method comprises several steps performed for each of a plurality of adjustment intervals, where each adjustment interval comprises multiple scheduling intervals. These steps include a step of allocating, to each component carrier, a respective power share of a total UE transmit power. This may be based, for example, on an estimated average number of physical resource blocks to be transmitted by the UE in each scheduling interval during the adjustment interval, for each of the component carriers. These steps further include calculating, for each component carrier, a required UE transmit power needed to achieve a target received signal power density at the network node, the target received signal power density being the sum of a nominal target power density previously signaled to the UE by the network node and a predetermined power density offset. The required UE transmit power is then compared, for each component carrier, to an available UE transmit power for the carrier, and any excess available UE transmit power for any given component carrier is reallocated to one or more other component carriers, to determine an allocated UE transmit power for each of the component carriers. The steps further include calculating, for each component carrier, an achievable received power density at the network node, based on the allocated UE transmit power for the respective component carrier, and calculating, for each component carrier, an adjusted power density offset for the adjustment interval, by subtracting the nominal target power density for the component carrier from the achievable received power density for the component carrier. The steps still further include the step of performing closed-loop power control during the adjustment interval for signals transmitted by the UE on each of the component carriers, using, for each component carrier, a target signal level or quality based on the nominal target power density for the component carrier and the adjusted power density offset for the component carrier for the adjustment interval.

Several embodiments of the techniques and apparatuses described herein provide for dynamic adjustment of a targeted received power spectral density to avoid power scaling by the UE and to maximize symbol info on scheduled carriers. This is achieved, in some embodiments, via a periodic change of the targeted received power spectral density, via TPC commands, in a manner that is transparent to the UE device. Prioritizing uplink carrier aggregation over the use of a higher-order modulation scheme may, under various circumstances, provide better overall throughput. Sustaining equal or similar transmit power density in the uplink for both of two component carriers, for example, gives near optimal results for most cases (similar, +−10 dB PL). It is robust for channel variation and can be easily implemented in an uplink scheduler. Other advantages and features of the present invention will be apparent upon reading the detailed description below and viewing the attached figures.

BRIEF DESCRIPTION OF THE FIGURES

FIG. 1 illustrates part of a wireless telecommunications network.

FIGS. 2a, 2b, and 2c illustrate examples of carrier aggregation.

DETAILED DESCRIPTION

Figure 3:
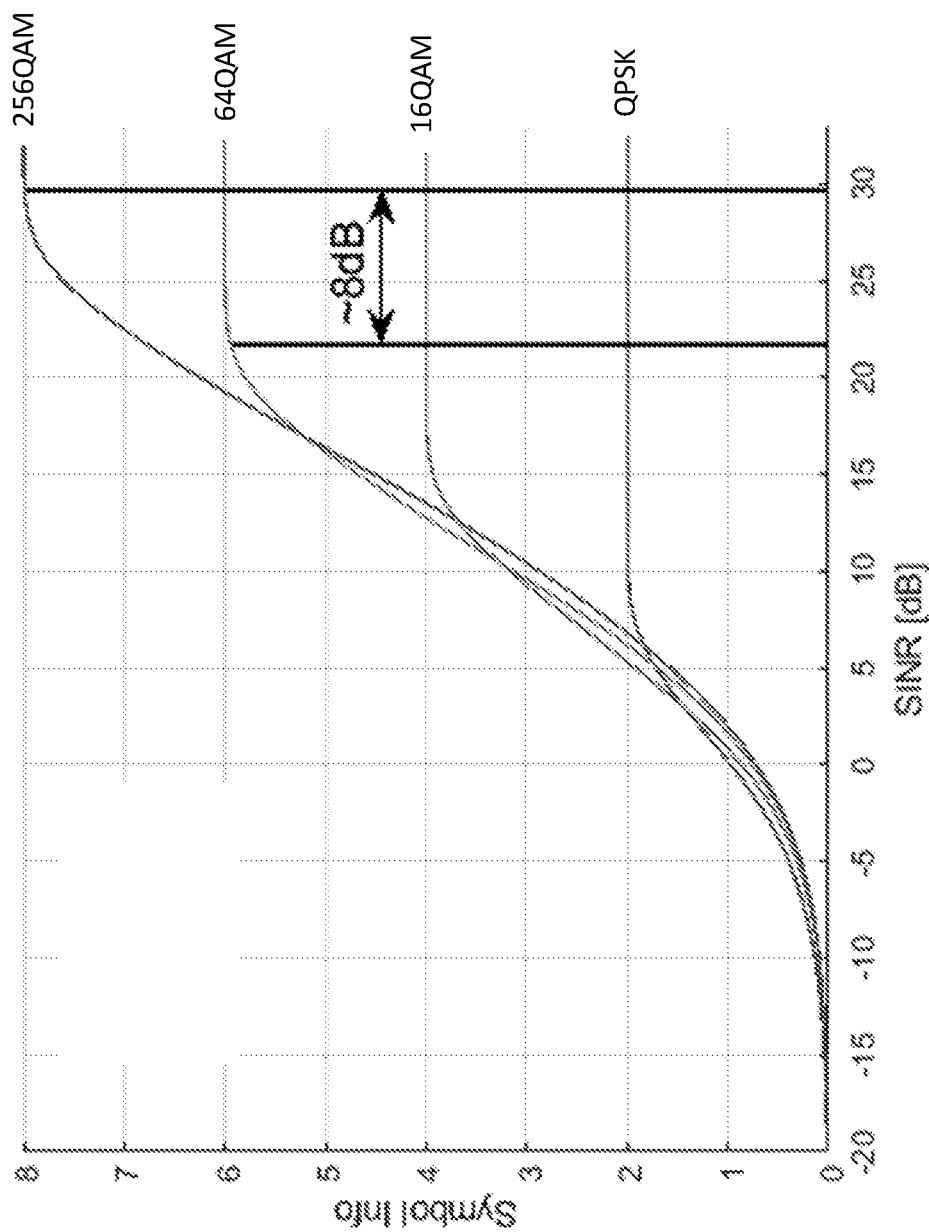
FIG. 3 shows symbol info versus SINR, for several modulation schemes.

Various techniques are described in the context of power control for PUSCH, in LTE systems. These techniques are also described with respect to carrier aggregation, as specified by the 3GPP specifications for LTE. However, it should be appreciated that the inventive concepts described here are not limited in their application to PUSCH, to LTE networks, or even to networks standardized by 3GPP. Nor are these techniques limited in their application to carrier aggregation as specified by 3GPP. Rather, these techniques may be applied more generally to any system where power control is performed for multiple carrier signals transmitted by a wireless device, referred to herein as a UE, where those multiple carrier signals may be independently scheduled for uplink transmissions by the wireless device.

Because of constraints on the UE's transmit power, which may vary depending on operating band, signal bandwidth, and various operational scenarios, transmit power control becomes more complicated when carrier aggregation is in use, i.e., when the UE may transmit on two or more carriers at the same time. Furthermore, additional complications arise when higher order modulation schemes are introduced, such as 64QAM and 256QAM, as each of these requires different signal-to-interference-plus-noise ratios (SINRs) as received by the eNB, for proper demodulation and decoding, as compared to each other and to lower-order modulation schemes such as 16QAM.

In particular, it has been observed that the combination of 256QAM in the uplink with uplink carrier aggregation results in suboptimal PUSCH allocations for existing UE power control mechanisms in an eNB, under certain circumstances. This problem may arise because of one or more of several factors.

First, when a UE configured with two component carriers in the uplink is scheduled on both carriers simultaneously, for example, it may happen that assigned grants will exceed the maximal terminal power. In this case, the UE will perform power scaling and reduce its total power output. When power scaling is triggered on the UE side, transmit power on all carriers without uplink control information (UCI) is reduced by the same factor, while the transmit power on carriers with UCI transmission is not scaled down. Due to simultaneous uplink and downlink scheduling, however, it may not be possible for the eNB to estimate whether UCI will be transmitted, and thus estimate how power scaling will be executed on the UE side.

Furthermore, the introduction of a new higher-order modulation scheme, 256QAM (quadrature amplitude modulation with a constellation of 256 symbols) for uplink transmission by the UE brings much higher receive power requirements at the eNB than 64QAM. One way to characterize performance of a modulation scheme versus the signal-to-noise-plus-interference ratio (SINR) in the receiver is called "symbol info," which describes expected value of successfully decoded bits/symbol with given SINR and modulation. Symbol info curves for each modulation are non-linear and increasing SINR over certain threshold gives diminishing returns.

To achieve symbol info equal to modulation order of 256QAM (8 bits/symbol), approximately 8 dB higher SINR is needed when compared to 64QAM (6 bits/symbol). This can be seen in FIG. 3, which illustrates symbol info versus SINR for each of several modulation schemes.

In a carrier aggregation scenario where both of two component carriers are configured with 256QAM, the power scaling problem becomes more common than in 64QAM case. In many cases, a UE configured for uplink carrier aggregation is power-limited, meaning that constraints on the UE's overall transmit power result in that the UE cannot transmit the maximum amount of data possible on each of two (or more) carriers at the same time, while fulfilling the eNB's received signal power requirements for successfully demodulating and decoding the signals.

Because the UE is typically power-limited in an uplink carrier aggregation scenario, the eNB must consider the UE's power constraints when determining how to schedule uplink transmissions for the two (or more) carriers, and must also consider these constraints when controlling the UE's transmit power on these carriers. A conventional scheduling and power control algorithm implemented by an eNB might address this by taking the following approach to splitting the UE's transmit power between the uplink carriers. Note that here, two uplink carriers are assumed. This approach can readily be extended to a scenario involving three (or more) uplink carriers. Note that elsewhere in this document, the following approach is referred to as "the conventional approach" or "the legacy approach"; these references should also be understood to encompass substantially similar approaches.

1) First, the eNB may select the carrier having the best signal conditions. This may be done using any one or more of any of a variety of signal metrics, such as a metric indicating a carrier-to-interference-plus-noise metric. In many cases, this may be the carrier having the lowest path loss.

2) Calculate how much uplink transmit power is needed on that carrier for PUSCH to achieve the necessary received signal power at the eNB, given that the entire bandwidth of the carrier is used (i.e., the maximum number of PRBs are scheduled), and given a particular modulation scheme, such as 256QAM. Note that here, this necessary received signal power at the eNB may be calculated as a function of $P_{O\_NOMINAL\_PUSCH}$, the nominal received signal power density at the eNB for acceptable demodulation and decoding, and a power density offset, referred to herein as puschPowerOffset256QAM for the 256QAM case, where this power density offset represents the increase in received power density necessary to achieve successful demodulation and decoding of a 256QAM signal compared to the nominal case, which may be referenced to 16QAM. A different power offset, puschPowerOffset64QAM, may apply when 64QAM is assumed for the uplink transmission.

3) Once the necessary uplink transmit power for the "best" carrier is calculated, as discussed above in step 2, any remaining power available to the UE for PUSCH transmission may be assigned to the second carrier. (If there is no remaining power, then the second carrier is not scheduled at all.) This quantity of uplink transmit power assigned to the UE for the second carrier may then be used by the eNB to determine how many PRBs may be scheduled for the UE in that second carrier, i.e., to determine how much of the second carrier's bandwidth may be scheduled.

Figure 4:
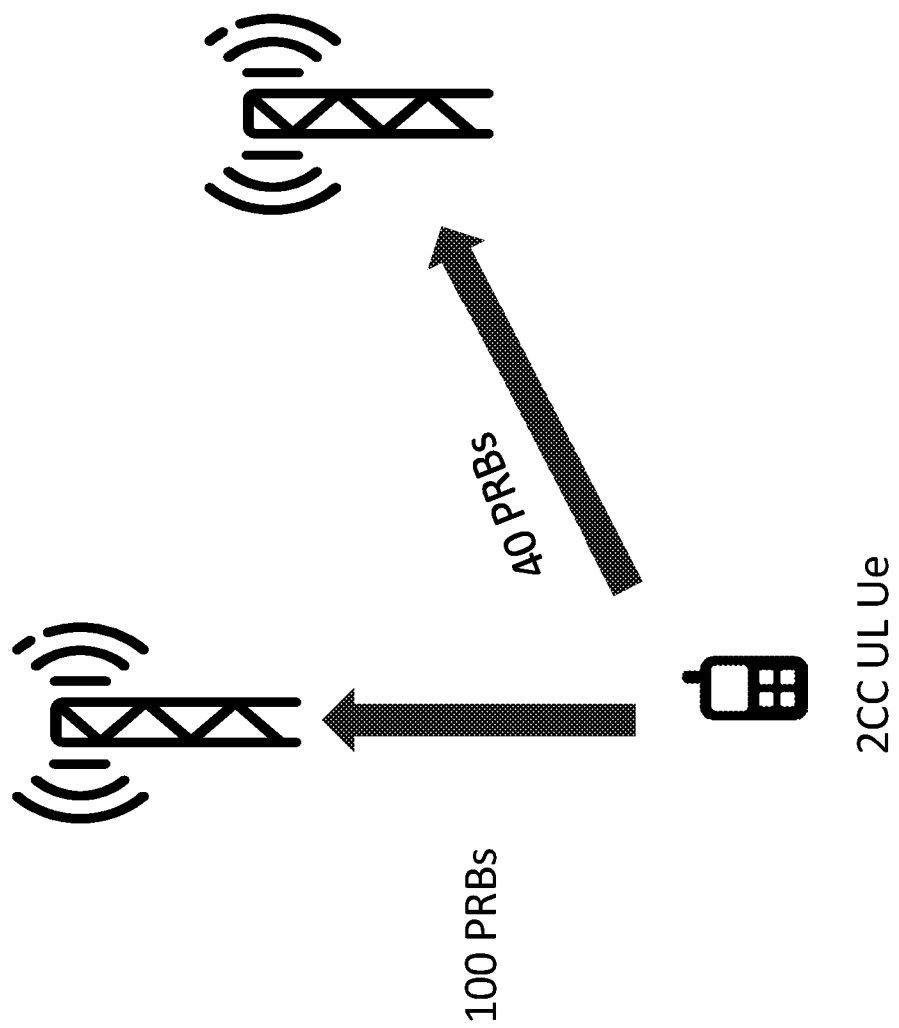
FIG. 4 illustrates an example loading of uplink component carriers, in carrier aggregation.

The result of this approach is that the first carrier may be fully loaded, while the second carrier is only partially loaded. An example is shown in FIG. 4, where a first of two uplink component carriers is fully loaded with 100 PRBs, while only 40 PRBs are scheduled for the second component carrier. Note that while FIG. 4 illustrates these uplink carriers as being terminated at different towers, the uplink carriers may be received by one base station (or other access point) or multiple base stations (or access points), in various embodiments or instances.

The discussion above refers to a parameter puschPowerOffset that is used by the eNB as an offset to $P_{O\_NOMINAL\_PUSCH}$ provided to the UE. Its value is not indicated to the UE. Rather, it is used by the eNB when determining a received signal level target. More particularly, the TPC commands issued by the eNB are calculated to force the UE to adjust its uplink transmit power for PUSCH so that the received signal power density at the eNB reaches a level based on the sum of $P_{O\_NOMINAL\_PUSCH}$ and puschPowerOffset. (It will be appreciated that these parameters are in dBm and dB, respectively, which means that summing them is equivalent to a multiplication of the received signal power density represented by $P_{O\_NOMINAL\_PUSCH}$ with a factor represented by puschPowerOffset.) Because of the different SINR requirements associated with demodulation of signals modulated using 16QAM, 64QAM, and 256QAM, respectively, this parameter comes in two versions: puschPowerOffset64QAM and puschPowerOffset256QAM. Table 1, below, shows how this parameter and the $P_{O\_NOMINAL\_PUSCH}$ parameter may be used by the eNB to determine a target received signal density, referred to in the table as Rx PSD (received power spectral density). Note that in a conventional approach, these values are statically configured on a per-eNB basis and applied to the UEs when scheduling the UEs, according to the UE's modulation capabilities.

TABLE 1

| UE UL max supported modulation | Target RX PSD |
| --- | --- |
| QPSK/16QAM | p0-NominalPUSCH |
| 64QAM | p0-NominalPUSCH + puschPowerOffset64QAM |
| 256QAM | p0-NominalPUSCH + puschPowerOffset256QAM |

As discussed above, the result of a conventional approach to scheduling multiple uplink carriers in a power-limited scenario is that the first carrier may be fully loaded, while the second carrier is only partially loaded. With the introduction of 256QAM, it is more likely that no power at all will be allocated to the second carrier, or that only a very small amount of power is allocated to the second carrier, since more power is needed to satisfy the required received signal power density at the eNB. A problem with this is that it can be shown that this can result in a non-optimal use of the uplink resources, even given the power constraints, because of the characteristics of the symbol info curves for 256 QAM and 64 QAM.

Figure 5:
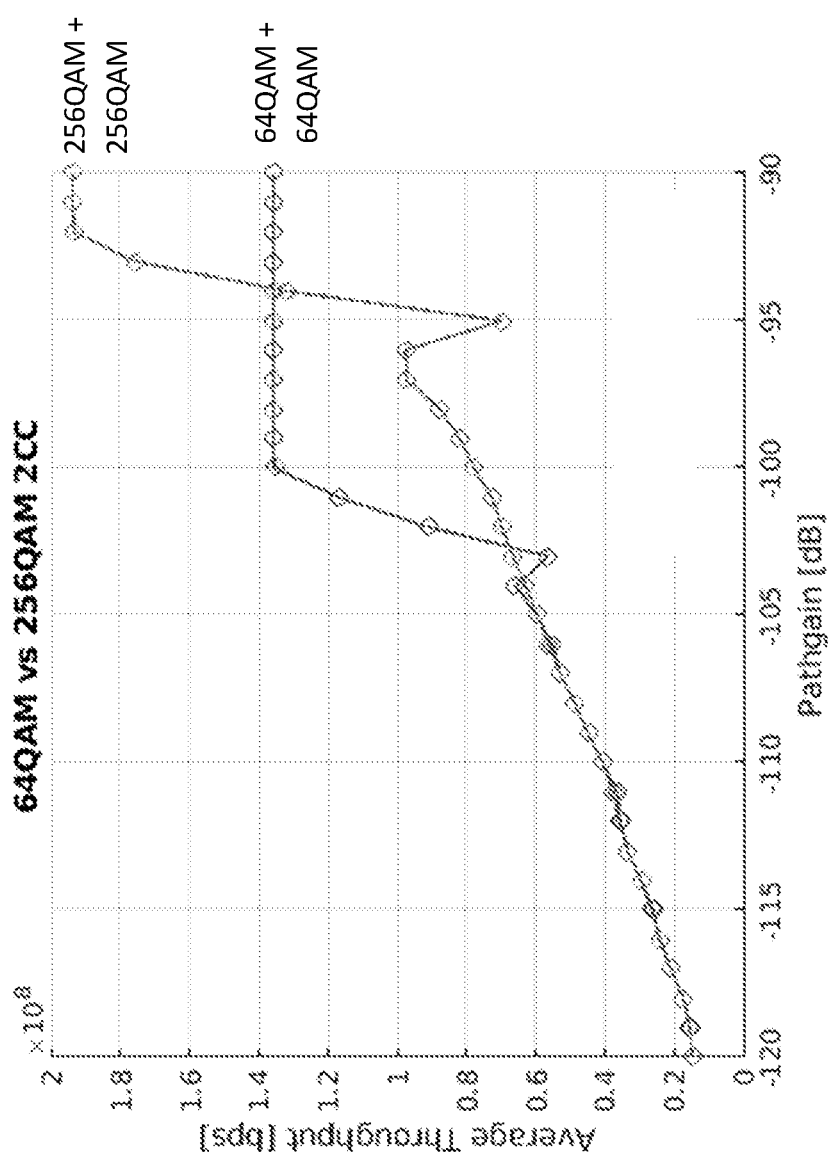
FIG. 5 shows the performance of 64QAM versus 256QAM in a power-limited scenario involving two aggregated component carriers.

This can be seen in FIG. 5, which illustrates a power-limited scenario involving two uplink component carriers. In FIG. 5, the max average throughput for two 20-MHz frequency-division-duplex (FDD) uplink carriers, in bits/second, is plotted against various values for pathloss, expressed here in negative values as pathgain. It can be seen that for a wide range of pathloss conditions (i.e., from about −103 dB pathgain to −94 dB pathgain), better throughput can be achieved by using 64QAM, because this results in the two component carriers being more evenly loaded. Only in very good signal conditions (pathgain above −93 dB) is the performance of 256QAM higher.

Thus, the conventional power splitting mechanism described above does not allocate power efficiently to the UE when 256QAM is configured, under a significant range of signal conditions. This is because achieving the required power signal density for 256 QAM ($P_{O\_NOMINAL\_PUSCH}$+puschPowerOffset256QAM) to get 8 bits/symbol from the 256 QAM signal requires an SINR than is about 8 dB (i.e., 6 times) higher than the required power signal density for 64QAM ($P_{O\_NOMINAL\_PUSCH}$+puschPowerOffset64QAM), which provides 6 bits symbols. Under the power-constrained scenario discussed above, requiring 6× power to achieve a 33% improvement in bits/symbol is a poor tradeoff.

For comparison, allocation of a secondary carrier requires only about 3 dB of additional transmit power and can result in a throughput gain of up to 100%. Thus, there is a wide range of cases where a UE with two component carriers scheduled with 64QAM and 64QAM, respectively, may have a higher throughput than a UE with 256QAM+256QAM configured.

It is not practical to mitigate these problems by modifying only the power-splitting part of the conventional algorithm described above, because the UE will perform power scaling on its uplink carriers, as was discussed in the background section above. Because the eNB does not know how UCI will be transmitted on a per-scheduling-interval basis, the eNB is unable to accurately estimate how the UE will actually distribute its signal power between the carriers.

The techniques described below address these problems by dynamically adjusting the power density offset parameter used by the eNB in its scheduling and power control decisions, rather than having a statically configured value as discussed above. As will be seen, this can be done in such a way that forces a more even loading of the component carriers, resulting in a more optimal uplink throughput.

The adjustment of this power density offset parameter may be done on a per-carrier basis. It may be done periodically, for example, in a manner that considers radio conditions on each component carrier, an estimated number of PRBs expected to be allocated to each component carrier on each scheduling interval, during an interval in which the adjusted power density offset parameter is applied, and the maximum supported modulation on each component carrier. The adjusted power density offset is used, along with the $P_{O\_NOMINAL\_PUSCH}$ and other parameters configured for the UE, when performing power control, and thus influences the TPC commands sent to the UE. Under a wide range of conditions, this will result in non-negative power headroom (PHR) calculations on the UE side, thus resolving the power scaling problem as no power scaling will then be necessary.

Figure 6:
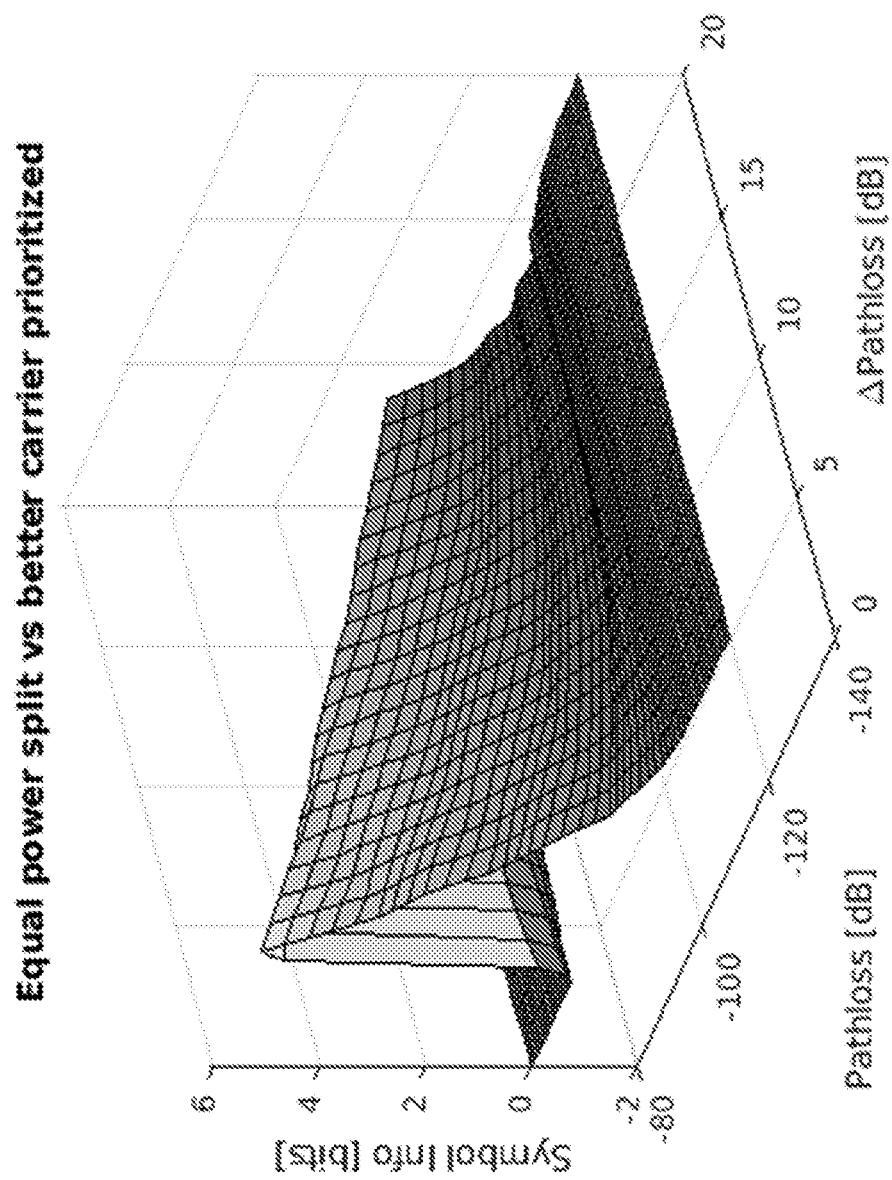
FIG. 6 illustrates the improved performance of an equal power split approach as described herein.

FIG. 6 illustrates the improved performance of the equal power split approach described below, as facilitated by the use of this dynamically adjusted power density offset parameter. The plot shown in FIG. 6 illustrates the relative improvement over a wide range of conditions, in terms of symbol info, provided by the equal split approach described herein, compared to the approach described above, where the better carrier is prioritized. As seen in the figure, this relative improvement exists over a range of pathloss conditions, as well as over a range of conditions where one carrier has a significantly better pathloss (e.g., up to 20 dB better) than the other.

Note that the term "equal power split" as used herein is something of a misnomer, as the techniques described herein do not require that the total PUSCH power transmitted by each UE be equal. Instead, this "equal power split" may be understood as referring to a distribution of power to the multiple carriers so as to result in an equal received signal power density, either as transmitted by the UE or as received at the eNB. By distributing the power "equally" between the carriers in this manner, the conventional approach described above can be outperformed by up to 5.5 Symbol info (average) due to prioritization of carrier aggregation over the use of the highest-order modulation scheme. It gives huge throughput gain in many cases (component carriers with up to 10 dB Pathloss difference), when the UE is power limited.

The adjusted power density offset parameter, which will be described in much further detail below, is used by the eNB during what will be referred to herein as an "adjustment interval," which may be considerably longer than the scheduling interval or TTI, e.g., hundreds of TTIs. After each adjustment interval, a new adjusted power density offset parameter may be calculated and used. In the LTE context, where the scheduling interval is a subframe, this adjustment interval might be 200 milliseconds, for example, which corresponds to 200 subframes. Smaller adjustment intervals, such as about 100 TTIs, or larger adjustment intervals, such as about 1000 TTIs may be used in various embodiments or instances. Simulations have shown that for LTE, an adjustment interval of 200 milliseconds works well, providing ample time for the power control loop to achieve near-optimal throughputs.

This "equal power split" approach may be described generally as follows. Note again that this technique is described herein in the context of LTE PUSCH transmissions, but the technique may be readily adapted to other systems and/or channels. Also, note that while this technique is described for the case of two component carriers, the technique can be readily extended to three (or more) uplink component carriers.

On a periodic basis, e.g., every 200 milliseconds, the following steps are carried out by the eNB:
1) First, the eNB estimates the average number of PRBs that will be transmitted by the UE in each scheduling interval, per component carrier. This may be done based on, for example, a history of UE transmissions, and/or based on any information the eNB may have about the UE's transmission queue. This estimation may take into account various other constraints, such as component carrier bandwidth, power constraints that may differ by component carrier, etc. Note that estimating the average number of PRBs that will be transmitted by the UE in each scheduling interval is equivalent to estimating the average bandwidth of the UE's signal transmission.
2) Next, the eNB splits the total maximum transmit power available to the UE for PUSCH transmission between the two uplink component carriers, in proportion to the respective average number of PRBs estimated in step 1, above. This may be done according to the following expression, for example:

$$\text{Power\_share}_{carrier} = \frac{PRB_{UL_{Ue}}(\text{carrier})}{\sum_{c=0}^{c=1} PRB_{UL_{Ue}}(c)},$$

where $\text{Power\_share}_{carrier}$ is the fraction of power for the carrier with an index carrier and $PRB_{UL_{Ue}}(\text{carrier})$ is the estimated average number of PRBs that will be transmitted by the UE in each scheduling interval (or TTI), for the carrier with index carrier.
3) The eNB next calculates the required transmit (Tx) power needed for PUSCH, for each component carrier, so as to achieve a target received power signal density of $P_{O\_NOMINAL\_PUSCH}$+MaxPuschPowerOffset, where this parameter MaxpuschPowerOffset corresponds to a static puschPowerOffset parameter discussed above, for a given modulation scheme, such as the puschPowerOffset256QAM discussed above. Note that in some embodiments, this target received power signal density may be computed using the parameter $P_{O\_PUSCH}$ rather than $P_{O\_NOMINAL\_PUSCH}$, so as to account for a UE-specific offset parameter signaled to the UE. (Recall that $P_{O\_PUSCH}$ is the sum of two parameters provided to the UE, $P_{O\_NOMINAL\_PUSCH}$ and $P_{O\_UE\_PUSCH}$.) This requires only minor differences in the calculations.
4) The required transmit power calculated above for each component carrier can be compared to an available transmit power for PUSCH transmission on the respective component carrier, where that available transmit power may be constrained by any number of factors. If there is any remaining power on a given component carrier (i.e., the required transmit power calculated according to step 3 is less than the available transmit power for PUSCH on that component carrier), up to this excess amount may be reallocated to the other component carrier, with that reallocation being constrained by any upper limits on PUSCH transmit power that are applicable to that other component carrier.
5) Given the powers allocated according to the preceding step 4 (including any reallocation of power from one component carrier to the other), the eNB can then calculate an achievable received signal power density at the eNB. Note that this calculation accounts for the estimated average number of PRBs transmitted by the UE on that component carrier, in each scheduling interval. Thus, the power allocated to that component carrier is divided by the estimated average number of PRBs per scheduling interval. Note that here, this division is done in the linear domain, i.e., an allocated power in Watts or milliwatts is divided by the estimated average number of PRBS, resulting in signal power density, in terms of Watts/PRB or milliwatts per PRB. This density may or may not be converted back into logarithmic form. Equivalent calculations could be performed in the log domain. The calculation of the achievable received signal power density at the eNB also accounts for the estimated path loss from the UE to the eNB, and may also account for other factors, such as antenna gains, receiver gains, and other gain adjustments.
6) The nominal received signal power density parameter discussed above ($P_{O\_NOMINAL\_PUSCH}$ or, in some embodiments $P_{O\_PUSCH}$) is then subtracted from the achievable received signal power density at the eNB, for each component carrier, to obtain an adjusted signal power density offset value, AdjPuschPowerOffset. Note that the nominal signal power density parameter may be specific to each component carrier, and the achievable received signal power density at the eNB as calculated in step 5 will generally differ, for each component carrier, and thus a separate AdjPuschPowerOffset is obtained.

7) Finally, a conventional power control process may be carried out for each component carrier, for each scheduling interval (TTI) in the adjustment interval, but using the just-calculated AdjPuschPowerOffset parameter in place of the static power offset puschPowerOffset256QAM or puschPowerOffset64QAM discussed above. It should be appreciated that this will result in the UE transmit power being adjusted to track a target received signal power density of $P_{O\_NOMINAL\_PUSCH}$+AdjPuschPowerOffset (or $P_{O\_PUSCH}$+AdjPuschPowerOffset), rather than $P_{O\_NOMINAL\_PUSCH}$+puschPowerOffset256QAM, as in the conventional approach. The value of AdjPuschPowerOffset will generally be (or may be limited to be) less than puschPowerOffset256QAM, and in some embodiments may be limited so that it doesn't go below zero, although other embodiments may allow for negative values. Note that this reduced target for received signal power density will not allow for the maximum throughputs achievable with 256QAM on a single carrier, but the division of the power between the two carriers will more than make up for this in the range of signal conditions discussed above, by providing a total throughput for the two carriers that exceeds what would be achieved using the conventional approach of fully loading one component carrier before scheduling the other.

Figure 7:
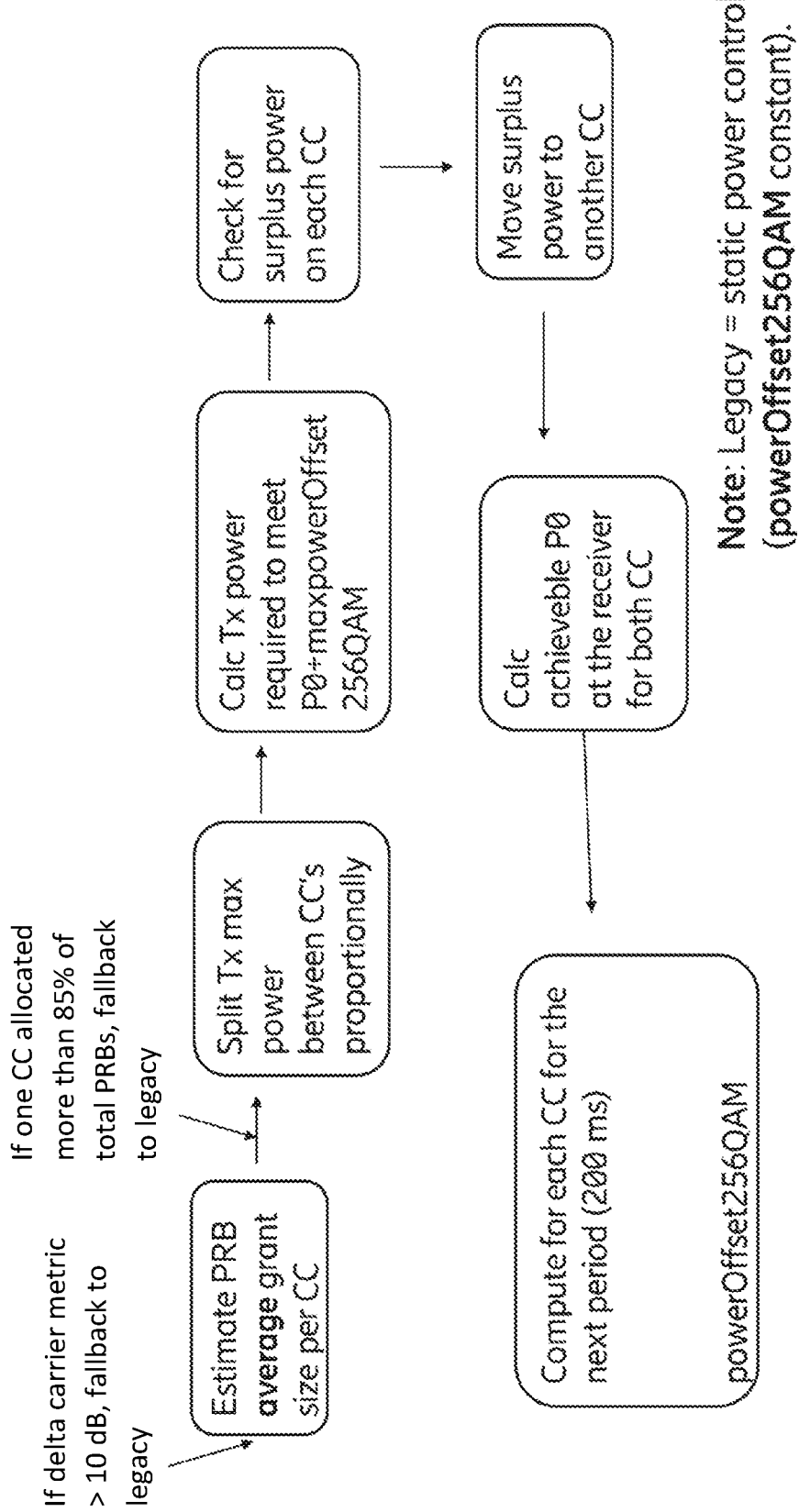
FIG. 7 illustrates an example process, according to some of the techniques described herein.

FIG. 7 illustrates the process described above. Note that FIG. 7 includes some additional details, in that it shows two points in the process where the eNB may choose to fall back to the conventional method, i.e., using a static puschPowerOffset64QAM for scheduling and power control, rather than the dynamically adjustable one described above. As shown in the figure, an eNB may be configured, for instance, to fall back to the conventional approach if a quality metric for one carrier is better than the corresponding quality metric for another by more than a predetermined amount, e.g., by more than 10 dB. This reflects the fact that the performance improvement gains from the dynamic offset adjustment approach are reduced in such a scenario. The eNB may also (or instead) be configured to fall back to the conventional approach if the estimated average numbers of PRBs per component carrier (CC), as described above in step 1, are such that more than some predetermined proportion of the total PRBs, e.g., 85%, are expected to be transmitted over one of the component carriers. Again, this is a scenario in which the improvement from using the dynamically adjusted power offset will be minimal, or non-existent.

Figure 8:
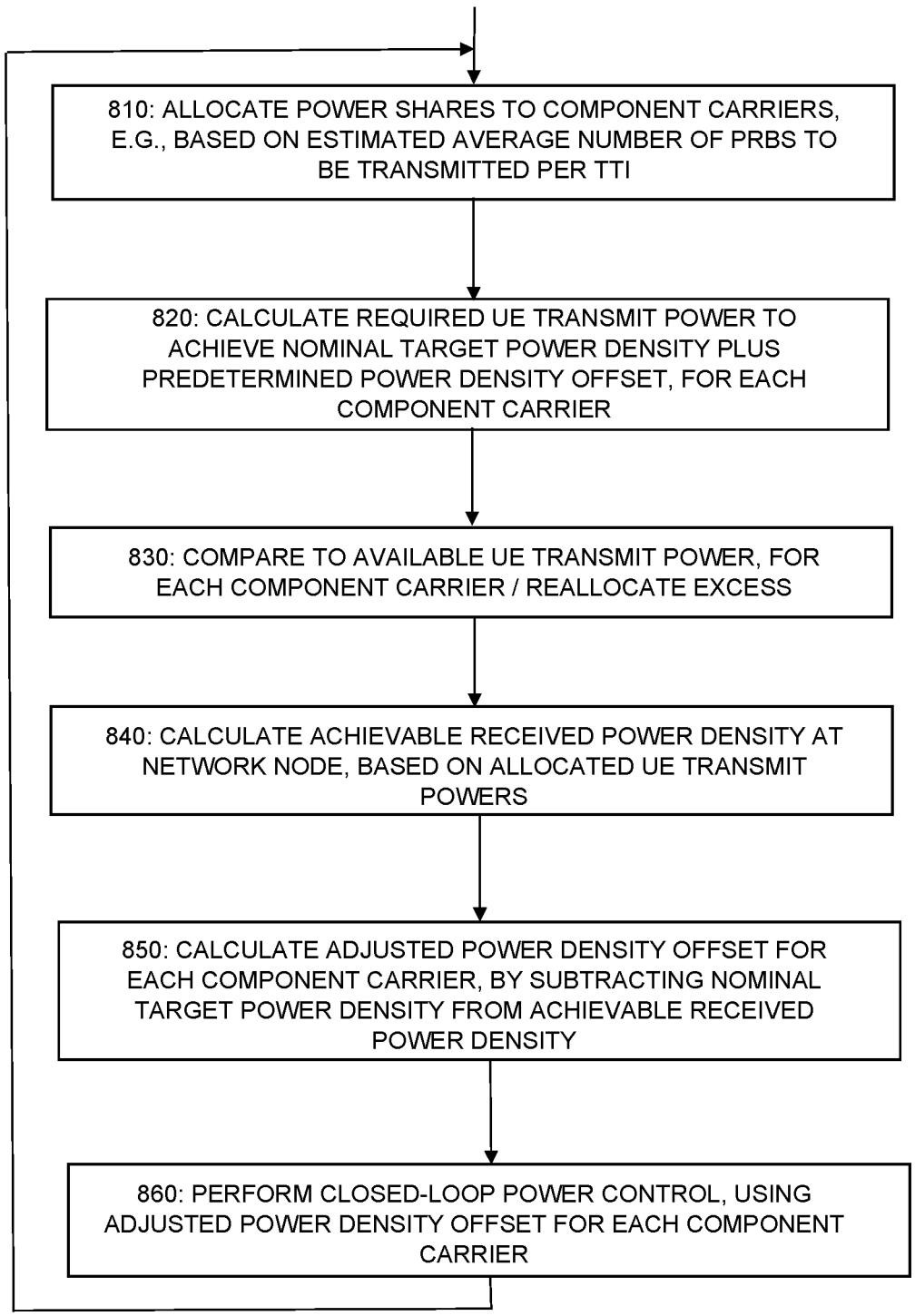
FIG. 8 is a process flow diagram illustrating an example method according to some of the presently described techniques.

In view of the detailed examples and description provided above, it will be appreciated that FIG. 8 is a process flow diagram illustrating an example method, as implemented by a network node such as a base station, for controlling UE transmit power when scheduling the UE for transmission on each of two or more component carriers, and more particularly for carrying out closed-loop power control using a dynamically adjustable power density offset. The method shown in FIG. 8 is a generalization of the techniques described above, but this method is intended to encompass the specific examples provided above. Accordingly, terms used to describe the method shown in FIG. 8, where they differ from corresponding terms used in the description above, should be understood as encompassing the latter.

For instance, the description of FIG. 8 below refers to a "nominal target power density." This term may be understood to include the $P_{O\_NOMINAL\_PUSCH}$ parameter discussed above, or the $P_{O\_PUSCH}$ parameter discussed above, or some other parameter or combination of parameters having a similar meaning, use, and purpose. The term "predetermined power density offset" may be understood to include the puschPowerOffset256QAM parameter or puschPowerOffset64QAM parameter discussed above, or some other parameter having a similar meaning, use, and purpose.

Also, the terms "signal power density" and "power density" mean the same thing, in the present context. References to a "received signal power density" or "received power density" refer to a signal power density as received at the network node, unless the context clearly indicates otherwise. Also, while the terms "predetermined power density offset" and "adjusted power density offset" are used below, these exact same parameters might also be regarded as a "predetermined power offset" and "adjusted power offset," since these parameters have the same effect whether applied to a signal power density or to a signal power. It will also be appreciated that these parameters act as "offsets," in that they may be added or subtracted to signal powers or signal power densities, only when expressed logarithmically, i.e., in dB. These parameters might equivalently be expressed linearly, in which case they would act as "factors," to be applied multiplicatively to signal powers or signal power densities. The term "offset" is used herein to refer to these parameters without regard to whether they are expressed in logarithmic or linear form.

Finally, the term "component carrier" as used herein should be understood in its broadest possible sense, to refer to the use by a wireless device (UE) of separate carrier signals to transmit user data, whether those component carriers are part of a carrier aggregation scheme as defined by 3GPP standards or used in another wireless network where the transmit power of signals transmitted by these carriers can be independently controlled.

The steps shown in blocks 810-860 of FIG. 8 are carried out by the network node for each of one or more adjustment intervals. In other words, the steps shown in blocks 810-860 may be repeated, e.g., periodically, to produce a dynamically changing adjusted power density offset for use in power control of the UE for scheduling intervals within the respective adjustment interval. The term "adjustment interval" is used for convenience to refer to the period of time for which a given adjusted power density offset is used by the network node. In some embodiments, the method shown in FIG. 8 may be performed periodically, e.g., every 200 milliseconds, in which case every adjustment interval has the same length, 200 milliseconds. The method may be performed more or less frequently, in various embodiments, and need not be performed periodically.

As shown at block 810, the method comprises allocating, to each of the two or more component carriers configured for the UE, a respective power share of a total UE transmit power. In some embodiments or instances, this is based on an estimated average number of physical resource blocks to be transmitted by the UE in each scheduling interval during the adjustment interval, for each of the component carriers.

Equivalently, this may be based on an estimated average bandwidth to be used by the UE in each component carrier, for each scheduling interval. In some embodiments or instances, the allocating of the respective power shares may be based on one or more alternative or additional factors, such as a priority of data transmitted on at least one of the component carriers.

Note that the term "scheduling interval" as used herein simply refers to the interval at which the network node schedules uplink and/or downlink transmissions by the UE. This scheduling interval might also be referred to as a transmission-time interval (TTI), in some contexts. Depending on the wireless network at issue and the terminology used in the corresponding specifications, this scheduling interval might be a subframe, a slot, a subslot, etc.

As shown at block 820, the method illustrated in FIG. 8 also includes the step of calculating, for each component carrier, a required UE transmit power needed to achieve a target received signal power density at the network node, where this target received signal power density is the sum of a nominal target power density previously signaled to the UE by the network node and a predetermined power density offset. Note that either or both of the nominal target power density and the predetermined power density offset may be carrier-specific, in some embodiments, in that they may differ from one component carrier to another. While the nominal target power density is known to the UE, the predetermined power density offset need not (and typically will not) be known to the UE.

As shown at block 830, the method further comprises the step of comparing, for each component carrier, the required UE transmit power calculated according to the step shown in block 820 to an available UE transmit power for the carrier, and reallocating any excess available UE transmit power for any given component carrier to one or more other component carriers, to determine an allocated UE transmit power for each of the component carriers. Here, "available UE transmit power" for a given component carrier refers to the component carrier's share of a maximum total UE power that may be used for transmitting the PRBs, e.g., as allocated according to the step shown at block 810, as potentially limited by other constraints, some of which may be specific to a component carrier. Thus, for example, if a UE is limited to +23 dBm (200 mW) of total transmit power for PUSCH transmission, and if the power shares calculated according to the step shown at block 810 are 40% and 60%, for first and second component carriers, then the available transmit power for the component carriers may be 80 mW and 120 mW respectively, unless there are other constraints that limit the transmit power to a smaller value, for one or both component carriers.

As shown at block 840, the method still further comprises the step of calculating, for each component carrier, an achievable received power density at the network node, based on the allocated UE transmit power for the respective component carrier. Here, the "allocated UE transmit power" refers to the power allocated to each component carrier in the step shown at block 830, including any reallocation of excess power.

As shown at block 850, the method includes the step of calculating, for each component carrier, an adjusted power density offset for the adjustment interval, by subtracting the nominal target power density from the achievable received power density for the component carrier. Note that this adjusted power density offset is carrier-specific, since, at least, the achievable received power density will generally be different for each carrier, given the preceding calculations.

Finally, as shown at block 860, the method includes performing closed-loop power control during the adjustment interval for signals transmitted by the UE on each of the component carriers, using, for each component carrier, a target signal level or quality based on the nominal target power density for the component carrier and the adjusted power density offset for the component carrier for the adjustment interval. It will be appreciated that the control loop might, in various implementations, work using a quantity that is derived from the nominal target power density and the adjusted power density offset (or derived from their sum), rather than simply using their sum directly. Generally speaking, however, the power control loop will have a goal of driving the received signal power density at the network node to a value related to the sum of the nominal target power density and the adjusted power density offset.

The allocating step shown in block 810 is based on an estimated average number of physical resource blocks to be transmitted by the UE in each scheduling interval during the adjustment interval. The step shown at block 810 may be preceded, in some embodiments, by a step of estimating this estimated average number of PRBs, for each component carrier, based on data indicative of previous transmissions by the UE and/or based on data indicative of transmission queue length at the UE. Additional or different information may be used, in other embodiments.

As discussed above, the adjustment interval may have any of various lengths, in different embodiments, where the adjustment interval includes multiple (usually many) scheduling intervals. In some embodiments, for example, the adjustment interval may comprise at least about 100 scheduling intervals. Other embodiments may use considerably longer adjustment intervals, e.g., encompassing several hundreds of scheduling intervals and/or being several hundreds of milliseconds in duration.

The predetermined power density offset used in the step shown at block 820 may be specific to one of a plurality of modulation schemes supported by the UE, in some embodiments. For example, this predetermined power density offset may be specific to 256QAM, when the network node is controlling a UE that supports 256QAM modulation.

In some embodiments, calculating the adjusted power density offset may comprise limiting the adjusted power density offset to a minimum of zero dB and a maximum equal to the predetermined power density offset. In other embodiments, however, the adjusted power density offset may be allowed to freely go below zero dB, or to some predetermined limit somewhere below zero dB.

As suggested by FIG. 8, the illustrated steps 810-860 may be repeated, for each of multiple adjustment intervals, in some embodiments. In some embodiments, the illustrated method may be selectively employed, depending on signal conditions or other factors. For example, a network node may be configured to perform power control according to the method shown in FIG. 8 under certain circumstances, but fall back to a conventional approach under other circumstances, e.g., if a difference in some quality metric between the component carriers exceeds a predetermined threshold (e.g., 10 dB), or if the method shown in FIG. 8 would result in more than a predetermined portion (e.g., 85%) of the PRBs being scheduled on a single one of the component carriers, etc.

Figure 9:
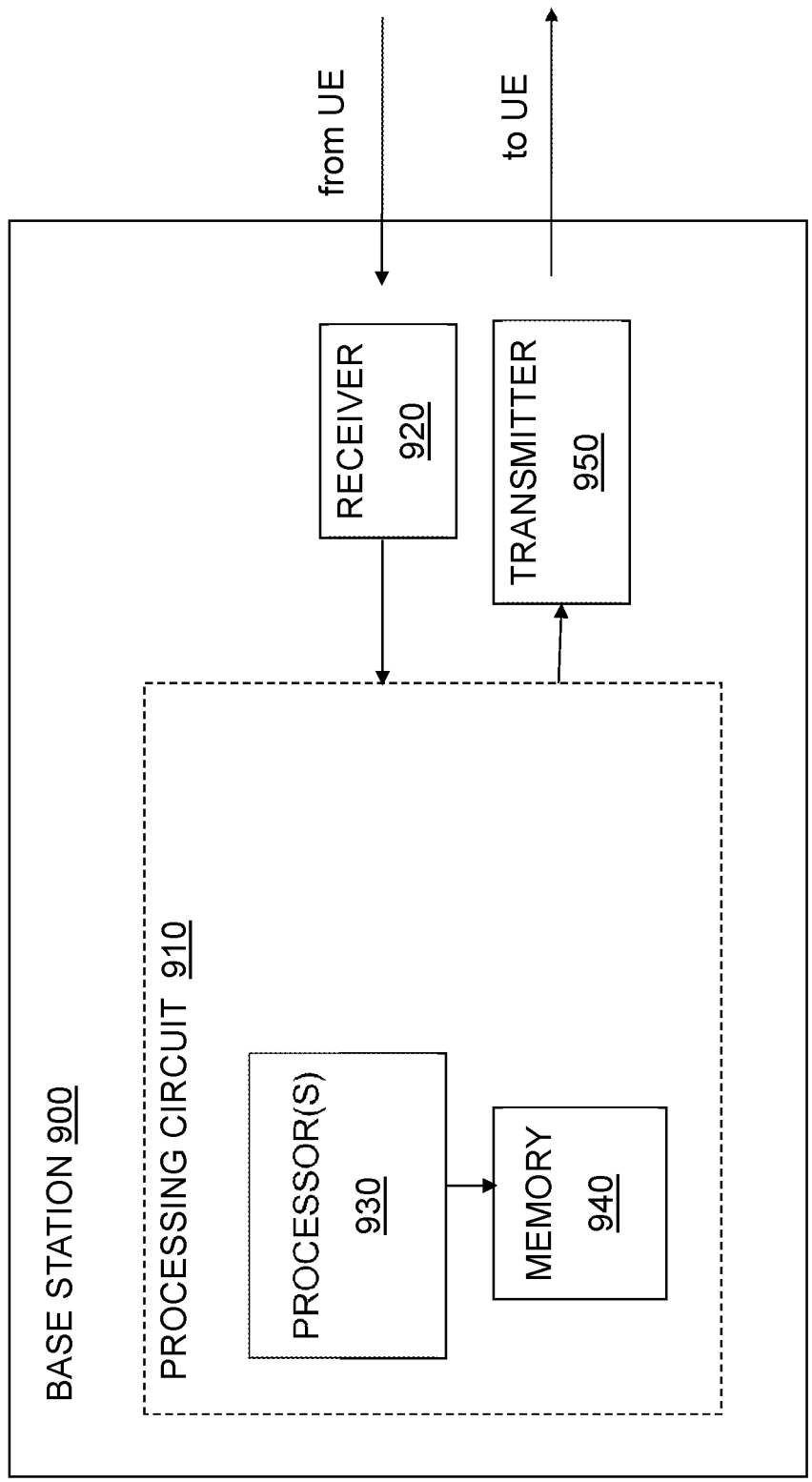
FIG. 9 is a block diagram of an example base station, according to some embodiments.

FIG. 9 illustrates, schematically, an example network node, here illustrated as a base station 900, configured to carry out any of the techniques described herein, according to various embodiments. Base station 900 comprises a receiver 920 configured to receive signals on two or more component carriers from a user equipment (UE) and a transmitter 950 configured to transmit signals on two or more component carriers to the UE. Base station 900 further comprises a processing circuit 910, which is operatively coupled to receiver 920 and transmitter 950 and configured to control receiver 920 and transmitter 950. Processing circuit 910 may in turn comprise one or more processors 930 (which may be any combination of microprocessors, microcontrollers, digital signal processors, and digital logic) and memory 940. Memory 940 may comprise program code for execution by processors 930, where the program code is configured to cause the processors 930 (and thereby the processing circuit 910) to carry out any one or more of the techniques described herein.

It should be noted that any or several of the components illustrated in FIG. 9 could be implemented as a single unit or be divided into several units. Processing circuit 910 may use software functioning in conjunction with a programmed microprocessor or a general purpose computer, and/or using an application specific integrated circuit (ASIC).

EXAMPLE EMBODIMENTS

Embodiments of the techniques described above include, but are not limited to, the following examples:
(a). A method, in a network node, for controlling UE transmit power when scheduling the UE for transmission on each of two or more component carriers, the method comprising, for each of a plurality of adjustment intervals, wherein each adjustment interval comprises multiple scheduling intervals:
allocating, to each component carrier, a respective power share of a total UE transmit power, based on an estimated average number of physical resource blocks to be transmitted by the UE in each scheduling interval during the adjustment interval, for each of the component carriers;
calculating, for each component carrier, a required UE transmit power needed to achieve a target received signal power density at the network node, the target received signal power density being the sum of a nominal target power density previously signaled to the UE by the network node and a predetermined power density offset;
comparing, for each component carrier, the required UE transmit power to an available UE transmit power for the carrier, and reallocating any excess available UE transmit power for any given component carrier to one or more other component carriers, to determine an allocated UE transmit power for each of the component carriers;
calculating, for each component carrier, an achievable received power density at the network node, based on the allocated UE transmit power for the respective component carrier;
calculating, for each component carrier, an adjusted power density offset for the adjustment interval, by subtracting the nominal target power density for the component carrier from the achievable received power density for the component carrier; and performing closed-loop power control during the adjustment interval for signals transmitted by the UE on each of the component carriers, using, for each component carrier, a target signal level or quality based on the nominal target power density for the component carrier and the adjusted power density offset for the component carrier for the adjustment interval.
(b). The method of example embodiment (a), wherein the method further comprises estimating, for each component carrier, the estimated average number of physical resource blocks to be transmitted by the UE in each scheduling interval during the adjustment interval, based on data indicative of previous transmissions by the UE and/or based on data indicative of transmission queue length at the UE.
(c). The method of example embodiment (a) or (b), wherein the adjustment interval comprises at least about 100 scheduling intervals.
(d). The method of any of example embodiments (a)-(c), wherein each scheduling interval is a subframe or slot.
(e). The method of any of example embodiments (a)-(d), wherein the predetermined power density offset is specific to one of a plurality of modulation schemes supported by the UE.
(f). The method of example embodiment (e), wherein the predetermined power density offset is specific to 256QAM.
(g). The method of any of example embodiments (a)-(f), wherein calculating the adjusted power density offset comprises limiting the adjusted power density offset to a minimum of zero dB and a maximum equal to the predetermined power density offset.
(h). A network node adapted to carry out a method according to any of example embodiments (a)-(g).
(i). A network node comprising a receiver circuit, a transmitter circuit, and a processing circuit operatively coupled to the receiver circuit and transmitter circuit and configured to control the receiver circuit and transmitter circuit and to carry out a method according to any of example embodiments (a)-(g).
(j). A computer program product comprising program code configured to cause a processing circuit executing the program code to carry out a method according to any of example embodiments (a)-(g).
(k). A computer-readable medium, such as a non-transitory computer-readable medium, comprising, stored thereupon, the computer program product of example embodiment (j).

The present invention is not limited to the above-described preferred embodiments. Various alternatives, modifications and equivalents may be used.

What is claimed is:
1. A method, in a network node, for controlling user equipment, UE, transmit power when scheduling the UE for transmission on each of two or more component carriers, the method comprising, for each of a plurality of adjustment intervals, wherein each adjustment interval comprises multiple scheduling intervals:
allocating, to each component carrier, a respective power share of a total UE transmit power;
calculating, for each component carrier, a required UE transmit power needed to achieve a target received signal power density at the network node, the target received signal power density being the sum of a nominal target power density previously signaled to the UE by the network node and a predetermined power density offset;
comparing, for each component carrier, the required UE transmit power to an available UE transmit power for the carrier, and reallocating any excess available UE transmit power for any given component carrier to one or more other component carriers, to determine an allocated UE transmit power for each of the component carriers;

calculating, for each component carrier, an achievable received power density at the network node, based on the allocated UE transmit power for the respective component carrier;

calculating, for each component carrier, an adjusted power density offset for the adjustment interval, by subtracting the nominal target power density for the component carrier from the achievable received power density for the component carrier; and performing closed-loop power control during the adjustment interval for signals transmitted by the UE on each of the component carriers, using, for each component carrier, a target signal level or quality based on the nominal target power density for the component carrier and the adjusted power density offset for the component carrier for the adjustment interval.

2. The method of claim 1, wherein allocating the respective power shares is based on an estimated average number of physical resource blocks to be transmitted by the UE in each scheduling interval during the adjustment interval, for each of the component carriers.

3. The method of claim 2, wherein the method further comprises estimating, for each component carrier, the estimated average number of physical resource blocks to be transmitted by the UE in each scheduling interval during the adjustment interval, based on data indicative of previous transmissions by the UE and/or based on data indicative of transmission queue length at the UE.

4. The method of claim 1, wherein allocating the respective power shares is based on a priority of data transmitted on at least one of the component carriers.

5. The method of claim 1, wherein the adjustment interval comprises at least about 100 scheduling intervals.

6. The method of claim 1, wherein each scheduling interval is a subframe or slot.

7. The method of claim 1, wherein the predetermined power density offset is specific to one of a plurality of modulation schemes supported by the UE.

8. The method of claim 7, wherein the predetermined power density offset is specific to 256QAM.

9. The method of claim 1, wherein calculating the adjusted power density offset comprises limiting the adjusted power density offset to a minimum of zero dB and a maximum equal to the predetermined power density offset.

10. A network node comprising a receiver circuit, a transmitter circuit, and a processing circuit operatively coupled to the receiver circuit and transmitter circuit and configured to control the receiver circuit and transmitter circuit and to control user equipment, UE, transmit power when scheduling the UE for transmission on each of two or more component carriers by, for each of a plurality of adjustment intervals, wherein each adjustment interval comprises multiple scheduling intervals:

allocating, to each component carrier, a respective power share of a total UE transmit power;

calculating, for each component carrier, a required UE transmit power needed to achieve a target received signal power density at the network node, the target received signal power density being the sum of a nominal target power density previously signaled to the UE by the network node and a predetermined power density offset;

comparing, for each component carrier, the required UE transmit power to an available UE transmit power for the carrier, and reallocating any excess available UE transmit power for any given component carrier to one or more other component carriers, to determine an allocated UE transmit power for each of the component carriers;

calculating, for each component carrier, an achievable received power density at the network node, based on the allocated UE transmit power for the respective component carrier;

calculating, for each component carrier, an adjusted power density offset for the adjustment interval, by subtracting the nominal target power density for the component carrier from the achievable received power density for the component carrier; and performing closed-loop power control during the adjustment interval for signals transmitted by the UE on each of the component carriers, using, for each component carrier, a target signal level or quality based on the nominal target power density for the component carrier and the adjusted power density offset for the component carrier for the adjustment interval.

11. The network node of claim 10, wherein the processing circuit is configured to allocate the respective power shares based on an estimated average number of physical resource blocks to be transmitted by the UE in each scheduling interval during the adjustment interval, for each of the component carriers.

12. The network node of claim 11, wherein the processing circuit is further configured to estimate, for each component carrier, the estimated average number of physical resource blocks to be transmitted by the UE in each scheduling interval during the adjustment interval, based on data indicative of previous transmissions by the UE and/or based on data indicative of transmission queue length at the UE.

13. The network node of claim 10, wherein the processing circuit is configured to allocate the respective power shares based on a priority of data transmitted on at least one of the component carriers.

14. The network node of claim 10, wherein the adjustment interval comprises at least about 100 scheduling intervals.

15. The network node of claim 10, wherein each scheduling interval is a subframe or slot.

16. The network node of claim 10, wherein the predetermined power density offset is specific to one of a plurality of modulation schemes supported by the UE.

17. The network node of claim 16, wherein the predetermined power density offset is specific to 256QAM.

18. The network node of claim 10, wherein the processing circuitry is configured to limit the adjusted power density offset to a minimum of zero dB and a maximum equal to the predetermined power density offset.

19. A computer program product comprising program code configured to cause a processing circuit of a network node executing the program code to control user equipment, UE, transmit power when scheduling the UE for transmission on each of two or more component carriers, by, for each of a plurality of adjustment intervals, wherein each adjustment interval comprises multiple scheduling intervals:

allocating, to each component carrier, a respective power share of a total UE transmit power;

calculating, for each component carrier, a required UE transmit power needed to achieve a target received signal power density at the network node, the target received signal power density being the sum of a nominal target power density previously signaled to the UE by the network node and a predetermined power density offset;

comparing, for each component carrier, the required UE transmit power to an available UE transmit power for the carrier, and reallocating any excess available UE transmit power for any given component carrier to one or more other component carriers, to determine an allocated UE transmit power for each of the component carriers;

calculating, for each component carrier, an achievable received power density at the network node, based on the allocated UE transmit power for the respective component carrier;

calculating, for each component carrier, an adjusted power density offset for the adjustment interval, by subtracting the nominal target power density for the component carrier from the achievable received power density for the component carrier; and performing closed-loop power control during the adjustment interval for signals transmitted by the UE on each of the component carriers, using, for each component carrier, a target signal level or quality based on the nominal target power density for the component carrier and the adjusted power density offset for the component carrier for the adjustment interval.

* * * * *